United States Patent [19]

Pieters

[11] 3,786,184

[45] Jan. 15, 1974

[54] FOCUSING

[75] Inventor: Leon Andre Pieters, Cambridge, England

[73] Assignee: Image Analysing Computers Limited, Melbourne, Royston, Hertfordshire, England

[22] Filed: Feb. 4, 1972

[21] Appl. No.: 223,611

[30] Foreign Application Priority Data

Feb. 5, 1971 Great Britain .................... 3,994/71

[52] U.S. Cl. ............ 178/7.2, 178/DIG. 29, 250/204

[51] Int. Cl. ............................................ H04n 5/26

[58] Field of Search .................... 178/7.92, DIG. 29; 353/76, 101; 352/140; 250/204, 234; 95/44 C

[56] References Cited

UNITED STATES PATENTS

| | | | |
|---|---|---|---|
| 2,968,994 | 1/1961 | Shurcliff | 250/204 |
| 2,838,600 | 6/1958 | Salinger | 178/DIG. 29 |
| 2,524,807 | 10/1950 | Kallman | 178/DIG. 29 |
| 3,622,797 | 11/1971 | Bragg | 178/DIG. 29 |

*Primary Examiner*—Robert L. Griffin

*Assistant Examiner*—Joseph A. Orsino, Jr.

*Attorney*—Browne, Beveridge, DeGrandi & Kline

[57] ABSTRACT

An automatic focusing system particularly adaptable for use with optical microscopes in which a final image is formed on the photo sensitive target of a television camera. Two objects are spaced by different amounts from the reflecting surfaces associated with the specimen under examination such that the reflected images are equally out of focus when the specimen image is in focus on the camera target.

16 Claims, 8 Drawing Figures

FOCUSING

Figure 1:
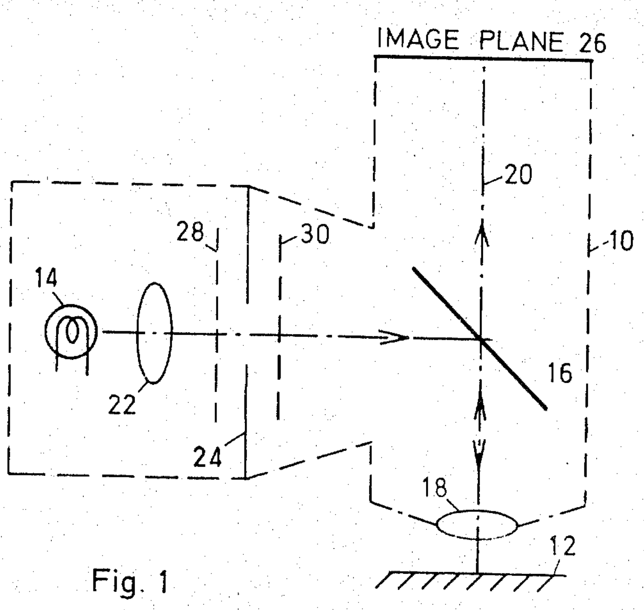

The two objects preferably comprise two sets of slits orientated so as to be perpendicular to the line scan direction in camera. The position and spacing of the slits is controlled so that by suitable synchronous gating, video signals corresponding to the two sets of slits can be separated. By comparing the two separated signals for equivalence the position of true focus of the final image can be determined.

The invention is suitable for both incident and transmitted light specimen illumination and as a further refinement the use of wave length selective filters and reflecting surfaces and sources of different wave length illumination are envisaged particularly for transmitted light specimen illumination.

The defocussed images of the slits may be formed on the television camera associated with the final image or on a separate television camera.

This invention relates to Automatic Focusing Systems particularly for use in conjunction with a Microscope.

If an electrical video signal is derived by scanning from an image, a measure of the sharpness of the focus of the image can be obtained by deriving a signal whose amplitude is proportional to the high frequency content of the video signal. By adjusting the focus, the amplitude of the signal corresponding to the high frequency content of the video signal, will vary and will reach a maximum at or near the position of optimum focus. This principle has formed the basis of many automatic focusing systems. Typically, an error signal is generated which effects an incremental change in the focus of an image and the high frequency content of the video signal is compared both before and after the incremental change in focus. A subsequent error signal is generated depending on the result of the comparison — to cancel out the original error signal if the change in focus has resulted in a reduction in the high frequency content or to produce a second similar error signal if the first error signal has produced an improvement in the high frequency content of the video signal. In this way a system can be made to seek for the position of optimum focus.

Unfortunately such systems suffer from two severe disadvantages. The first disadvantage is that the absolute level of the high frequency content of the video signal will vary with the image content. Thus in an image containing a large number of small sharply defined features the high frequency content will be much higher than in the video signal corresponding to an image containing only one small well defined feature. The second disadvantage lies in the fact that many features are not well defined. It is sometimes difficult to derive sufficient high frequency content from the video signal of such a feature as a pathological or biological specimen to enable a focus control signal to be derived. Furthermore, where the actual specimen is itself of only low contrast, the system is quite likely to focus on the mounting medium of the specimen or (where provided) the glass cover slip to the specimen since these objects will provide a greater level of high frequency content in the video signal than the specimen itself.

It is a primary object of the present invention to provide an automatic focusing system in which the focus control signal is virtually independent of the content of the image to be focused.

It is a second object to provide a focusing system in which two electrical signals are generated whose relative amplitudes can be compared so as to indicate when the image is in focus and, if not in focus, which direction the focusing system must be adjusted in order to improve the focus of the image.

The invention is directly suitable for optical systems in which the specimen is illuminated by incident light. However it is a further object of the invention to provide a modified system which can be used with specimens which are transparent or translucent and are illuminated by so called transmission illumination.

It is a further object to provide an automatic focusing system in which the measure of the focus and a correction signal can be obtained from a single scan by conventional line scanning of the field.

According to the present invention a system for obtaining a correctly focused image in an optical system of a specimen mounted on a carrier comprises a reflecting surface on the carrier to reflect the images of two objects spaced by different amounts from the reflecting surface, onto a photo-sensitive device from which are obtained by line scanning two separate electrical signals whose magnitudes are indicative of the sharpness of focus of the two object images, the latter being determined by the spacing between the carrier and the optical system, the relative positions of the two objects and the photo-sensitive device being selected so that the two object images are equally de-focused when the spacing between the carrier and the optical system carrier gives a correctly focused image of the specimen, circuit means for generating an electrical error signal whose magnitude is proportional to any difference between the magnitudes of the said two electrical signals and focus adjusting means operable in response to an error signal to alter the spacing between the carrier and the optical system in a manner to reduce the error signal magnitude.

Preferably the error signal polarity indicates whether the spacing is to be increased or decreased (i.e.the direction in which the carrier must be moved relative to the first optical system, or *vice versa*), in order to reduce the error signal magnitude.

Preferably the two objects are gratings having parallel alternate narrow and wide slits and the two are positioned so that the narrow slits of one are alighed with the wider slits of the other and *vice versa*.

According to a preferred feature of the present invention, where the specimen is opaque or largely so the surface thereof may be employed as the reflecting surface on the carrier. In the event that the specimen is insufficiently opaque but can still be illuminated from above by incident light, the specimen is preferably mounted on a reflective backing which then forms the reflective surface. Alternatively a polished surface of the carrier constitutes the reflecting surface.

In a preferred embodiment of the present invention as applied to an incident light microscope, two gratings are positioned one on either side of the field stop in the illumination system so that the two gratings just extend into the area of the field stop along one edge thereof thereby reducing the effective area of illumination on the specimen by a small amount, the two gratings being aligned as previously described. Where the focused image of the specimen is formed on the target to a television camera, the latter forms the photo-sensitive device and the video signal derived by scanning in the camera, is gated during each frame over that portion of the frame which corresponds to the reflected images of the gratings. Conveniently the gratings are arranged so that their slits are perpendicular to the line scan direction and since they are fixed relative to the scan if the rate of scanning is constant the video signal amplitude excursion corresponding to one set of narrow slits can be separated from those corresponding to the other set of narrow slits (and from the total video signal) to thereby provide the two separate video signals. The amplitude excursions (or mean values) of the two signals can be compared in order to derive an error signal and depending which is greater than the other so the error signal can be given one or other polarity so that a focus control signal can be generated for application to a translation means for effecting relative movement between the specimen carrier and the microscope objective.

It will be appreciated that a distinct advantage is obtained from using the surface of the specimen or the specimen mounting rather than a separate surface on the carrier by which to reflect the focusing information contained in the two out of focus images of the gratings. Nor only is the surface therefore fixed relative to the specimen but in addition a single optical system can be employed for producing the image of the specimen and the two object (grating) images as previously described. Where the specimen is opaque or rests on an opaque background this is easily achieved. However where the specimen can only be illuminated by transmitted light (and is therefore referred to as a transmission specimen) there is no surface readily avilable from which the out-of-focus images of the two objects (gratings) can be reflected. It will be appreciated that the very small percentage reflection which could be obtained from ordinary glass surfaces will be insufficient since the advantages of the invention are best realised when a strong signal is obtained from the reflected images of the slits in the gratings. This problem with specimens which are transmission illuminated can be overcome according to another aspect of the present invention by providing two different sources of illumination one to provide the light for transmission illumination of the specimen and the other to provide a different type of illumination for the gratings, the first source being selected to provide light which is transmitted through the specimen and the second source being chosen to provide light which is largely reflected by the specimen or a surface associated with the specimen. In some cases the material forming the specimen or the mounting for the specimen will provide sufficient selectivity to allow for example one colour of light to be employed for transmission illumination of the specimen and another colour to be employed for illuminating the gratings and producing the images of the gratings on the specimen. However it is to be appreciated that the invention is not limited to light in the visible spectrum and one or other of the sources may be in the ultra violet or infra red range. The selectivity of the specimen or supporting surface of the specimen can be improved by coating the specimen or the supporting surface with a wavelength selective optical coating. Such coatings are well known and a typical coating which will allow visible light to pass but will reflect infra red light is CALFLEX - C.

Figure 2:
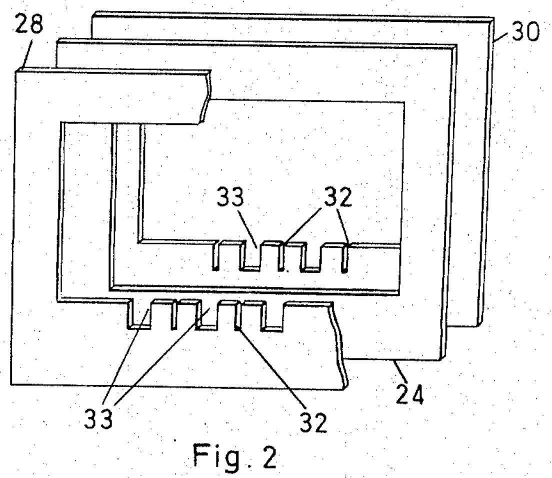
Figure 5:
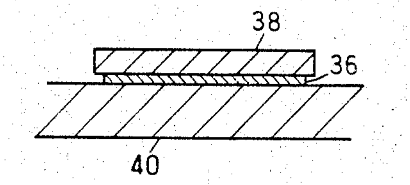
Figure 3A:
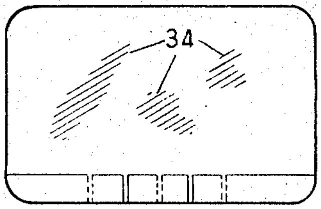
Figure 3B:
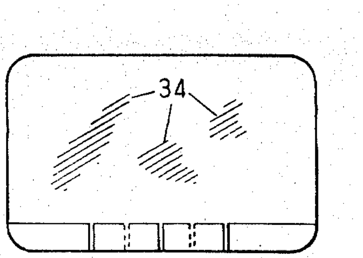
Figure 6:
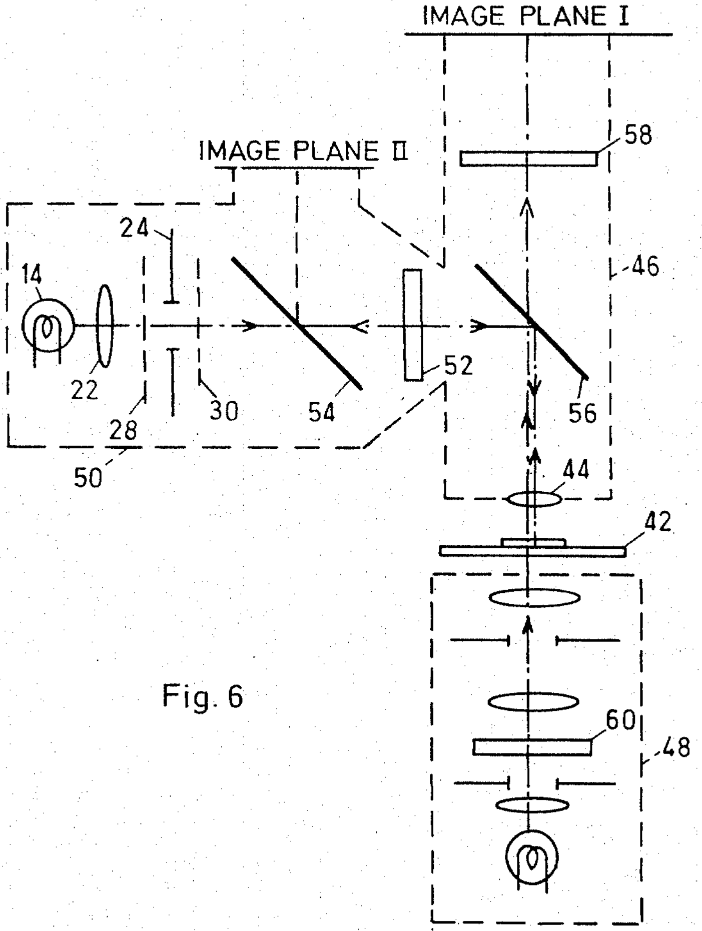
Figure 4:
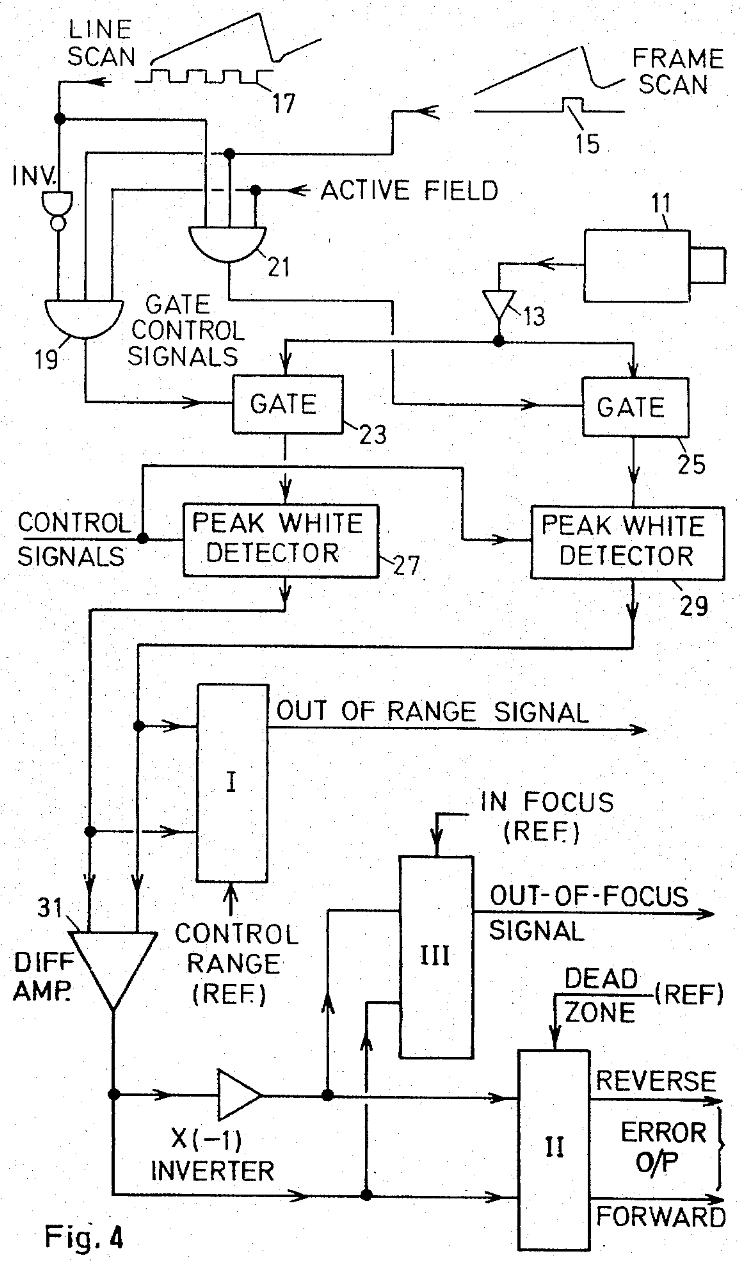
Figure 7:
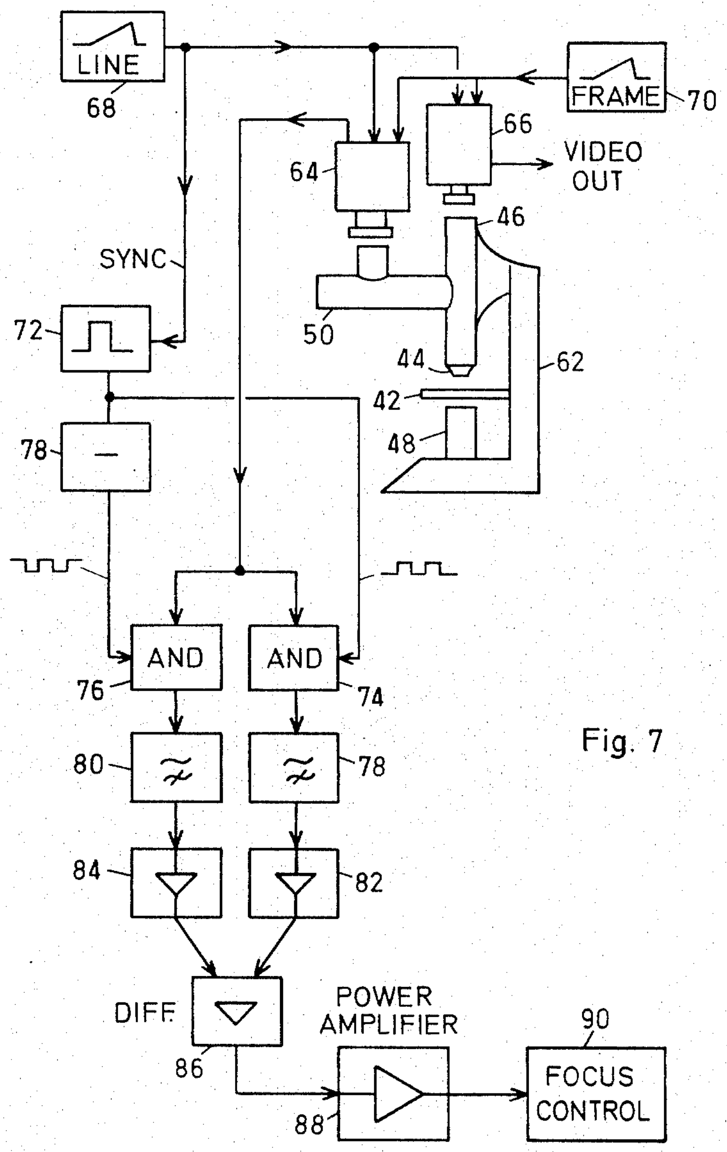

The invention will now be described by way of example with reference to the accompanying drawings in which, FIG. 1 illustrates diagrammatically the optics of a microscope system for viewing a specimen illuminated by incident light which is directed onto the specimen through the final objective of the microscope and which includes focusing gratings in accordance with the present invention, FIG. 2 is a perspective view of the illumination aperture stop and the two gratings on either side thereof the optical system of FIG. 1, FIG. 3*a* represents a television display of what would be seen through the microscope of FIG. 1 when the system is out of focus by a small amount so that one of the sets of grating slits is in focus and the other is out of focus, FIG. 3*b* is a similar illustration to that of FIG. 3*a* but illustrates the condition when the system is out of focus by the same amount in the opposite direction so that the other set of grating slits are in focus, FIG. 4 is a block circuit diagram of a complete system based on FIG. 1, FIG. 5 is a section through a microscope slide carrying a specimen which is illuminated by transmission illumination FIG. 6 is a diagrammatic representation of the optics of a microscope viewing a transmission illuminated specimen and incorporating focusing gratings in accordance with the invention FIG. 7 is a block schematic diagram illustrating a complete automatic focusing system for a microscope whose optical systems correspond to those shown in FIG. 6.

FIG. 1 illustrates part of the optical system of a microscope generally designated 10 viewing a specimen 12 which is illuminated by incident light from a source 14. Only the optics up to and including the image plane of the microscope 10, are shown since above this point the optics can be of any conventional design. A semi-reflecting mirror 16 is interposed between the image plane and the objective 18 and is so arranged that light from the source 14 is reflected in a downward direction through the objective 18 and onto the specimen surface 12. However, due to the semi-reflecting properties of the mirror 16, light reflected from the surface of the specimen 12, back through the objective 18 can pass through the mirror 16 as denoted by the dotted line 20.

The light from the source 14 is focused by a lens 22 and a field stop 24 is situated at the focal plane of the illumination optical system. As is conventional, the position of the source 14 and the position and properties of the lens 22 are such that when in combination with the mirror 16 and objective 18, the field stop 24 is in focus on the surface of the specimen 12 when the optical system of the microscope including the objective 18 produces an in focus image of the specimen surface at the image plane 26.

In accordance with the invention thus gratings 28, 30 are situated one on each side of the field stop 24, the positions of the two gratings being selected, relative to the field stop 24, so that when the field stop is in focus on the specimen surface, the two gratings 28 and 30 are equally out of focus by the same amount. It will be seen that relative movement between the microscope 10 and specimen 12 (whilst all other parameters are kept constant) will enable one or the other of the two gratings 28 and 30 to be focused correctly on the specimen surface. Conveniently the two gratings are staggered relative one to the other so that the image of one can be discerned from the image of the other on the specimen surface. In this way it is possible to look at the image of the gratings through the microscope and determine which way it is necessary to adjust the focus of the image of the specimen 12.

One arrangment of field stop 24 and gratings 28, 30 is shown perspectively in FIG. 2. For clarity, the grating 28 is shown partly cut away.

Each grating contains an aperture corresponding to the aperture in the field stop 24 but whose lower edge includes a plurality of slits 32 and apertures 33. When positioned as shown in FIG. 2, and viewed along the optical axis of the illumination system, the slits 32 of grating 28 will be seen to occupy the aperture 33 between the slits 32 of the grating 30. It will be seen that the gratings only interfere with a small region at the lower end of the aperture in the field stop 24 (which determines the area over which the specimen is illuminated) and consequently only a narrow band containing the focusing images of the gratings will be seen on the specimen 12. The remainder of the specimen will be illuminated in the usual way.

Although such an arrangement can be used to facilitate the manual focusing of a microscope, the system is of particular application to an automatic focusing system. This is shown in FIG. 4 in which the image produced by the microscope is focused onto the target of a television camera which produces a scanned electrical video signal in a conventional manner whose variations correspond to the variations in contrast of the image focused onto the target. This signal is amplified by video amplifier 13. The camera is orientated so that the line scan direction of its scanning system is substantially parallel to the longer dimension of the rectangular aperture in the field stop 24. In this way the line scans intersect each of the slits 32 perpendicularly. The video signal corresponding to the slits is gated from the remainder by gating pulses 15 derived from the frame scan signals and the signals corresponding to the two sets of slits are obtained by gating pulses from a square wave generator 17 synchronised with the line scan signals. Two control signals are obtained by combining the gating pulses in two gates 19, 21 for controlling two gates 23, 25 controlling the output from amplifier 13 to obtain respectively a first signal containing only video information corresponding to the slits 32 of grating 28 and a second video signal corresponding only to the slits 32 of the grating 30. The gates 23, 25 also have a clamping action so that the resulting signals are indicative of modulation depth. The gated signals are applied to peak white detector circuits 27, 29 whose integrating action also serves to reduce noise level. The outputs from 27, 29 are applied to difference amplifier 31 to indicate any difference in amplitude of the two signals and therefore any difference in focus of the image of the one set of slits as compared with that of the other set of slits and an error signal produced corresponding to any such difference. Where the system is to be used with a single frame analysis system (e.g. where the specimen is flash illuminated and the residual image on the camera target subsequently scanned for one frame) a further gating signal is applied to the gates 19, 21 (known as "active field") for the duration of each frame scan. Control signals are applied to the peak white detector circuits to operate re-set, sample and hold circuits associated with the peak white detectors.

If the peak white signals from 27, 29 are below a level set by a threshold I (known as the control range) then the system is a long way out of focus and the focusing system motor (not shown) is made to scan fast throughout the entire range until one or other of the peak white signals comes within the control range set by threshold I.

When within the control range, the difference signal is used to derive an error output for driving the motor in the correct direction by one small increment per measuring frame. The increment size is chosen to ensure loop stability.

When the difference signal becomes less than a level set by threshold II, defining a "dead zone," the error signal is cancelled and the focusing system holds in that condition.

During subsequent scanning of a specimen, the system keeps the microscope in focus by generating further error signals if and as appropriate. If however, the required rate of correction becomes to great the error signal exceeds a third threshold (threshold III) defining an "out of focus" condition and a warning signal is generated and the scanning stopped.

The "out of focus" condition defines the acceptable range of focus and the "dead zone" is suitably less than this range.

FIG.'S. 3*a* and 3*b* of the drawings illustrate the display as obtained on a monitor screeen from the output of the television camera. The specimen includes a number of features denoted by reference numeral 34 and the features together with the image of the slits 32 of the gratings 28 and 30 are displayed on the monitor screen. The gratings appear along the lower edge of the displayed picture and in FIG. 3*a* one set of slits are shown to be in focus and the other set of slits (which are located in the apertures between the slits of the other set) are out of focus. By adjusting the focus control of the microscope, the opposite situation can be obtained in which the first set of slits are out of focus and the other set are in focus. Relative movement of the microscope and specimen from the condition illustrated in FIG. 3*a* to that illustrated in FIG. 3*b* will at some time result in the two peak white signals having substantially the same amplitude — which condition corresponds to an in-focus condition for the field stop 24 on the specimen 12. It will be appreciated that the microscope and illumination system must be set up during manufacture (as is conventional) so that the optical system of the microscope produces an in focus image of a specimen 12 at the same time as the field stop 24 is in focus on the surface of the specimen 12. However it will be appreciated that once this setting has been obtained no further adjustment of the position of the field stop 24 or lens 22 etc. is necessary.

The system illustrated in FIG'S. 1 to 4 possesses the following features:

1. Dark features in the specimen which are visible through the slits do not produce an error signal, even though they may be in sharp focus. They simply reduce the area of white used to derive the peak level and the error is negligible unless they contribute a very high proportion of slit array area.
2. Being a differential system, the null point is independent of light level.
3. Tilt of the speciment only produces second order errors.

The system is suitable for incident bright field illumination on specular reflecting specimens with a uniform "white" reflecting surface, any features producing a light level below the white background (i.e. feature reflectivity is less than the background reflectivity). However for features having a reflectivity greater than that of the background, the slits could by replaced by fingers producing black bars on the specimen reflecting surface and the peak white detectors replaced by peak black detectors.

FIG. 5 of the drawings illustrates (in cross section) a typical microscope specimen in which the specimen material or slice 36 sandwiched between a cover slip 38 and a slide 40. Typically both the cover slip 38 and slide 40 are of glass. Where the specimen material 36 has a sufficiently different refractive index from the slide and/or mounting medium and is illuminated by incident illumination, the system as described in FIG. 1 can be employed and a reflected image of the fingers of the two gratings will be obtained. Where however the specimen material 36 does not have a sufficently different refractive index and for analysis must be illuminated from below the system of FIG. 1 must be modified along the lines of that shown in FIG. 6. In this modified system a coating of wave length selective material is applied to the upper surface of the slide 40 (or to any other convenient glass surface in contact with the specimen material 36 and two light systems are employed one which is transmitted by the wave length selective coating and the other which is reflected by it and (where necessary) different image producers are employed one for viewing the specimen and the other for picking up and deriving a scanned electrical video signal from the reflected image of the gratings.

In FIG. 6 a specimen generally designated 42 and constructed as illustrated in FIG. 5, is situated beneath the objective 44 of a microscope generally designated 46. The specimen 42 is illuminated from below by a transmission illumination system generally designated 48 and a second illumination source is provided generally designated 50 which also contains focusing gratings situated one on either side of the field stop for the incident light illumination system.

As described with reference to FIG. 5, the specimen carrier includes a wave length selective coating and the two light sources 48 and 50 are chosen so that light from the source 48 is transmitted directly through the specimen and light from the source 50 is reflected by the wave length selective coating. Thus, for example, light in the visible spectrum may be generated by source 48 for transmission illumination of the specimen and ultra violet or infra red light may be generated by the source 50. Alternatively the specimen may be illuminated from below by ultra violet (or infra red) light in which case the incident light source can be in the visible range or infra red range. Thus it will be seen that the only criterion is that the light from the one source must not have a component common to the light from the other source. In some circumstances it is envisaged that the two sources may both provide light in the visible range but at two different wave lengths which are sufficiently separated as to be separable by filters or dichroic mirrors.

For simplicity of description only, the two sources 48 and 50 of FIG. 6 wil be considered as generating light in the visible range (in the case of source 48) and ultra violet light (in the case of source 50).

Since the source 50 is largely similar to that shown in FIG. 1, the same reference numerals have been used to denote similar parts. Thus the source comprises a source of ultra violet light 14 a lens 22 a field stop 24 and two gratings 28 and 30. It will be appreciated that since the source 14 and the gratings 28 and 30 are only to be employed for obtaining a narrow focusing strip on the specimen surface, the aperture 24 is simply a narrow strip in line with the slits in the gratings 28 and 30. The ultra violet light from the gratings passes through a semi-relecting mirror 54 into the microscope 46 and is reflected through the objective 44 and onto the wave length selective reflecting surface on the specimen , by a second semi-reflecting mirror 56. The reflected image from the wave length selective coating passes through the objective 44 and is again reflected by the semi-reflecting mirror 56 and the reflected portion from the semi-reflecting mirror 54 can be picked up by a suitable detector having an imaging system at the image plane II. Typically such a detector comprises a television camera having a target which is sensitive to ultra violet light. The specimen 42 is also illuminated from below as previously described and light passing through the specimen also enters the objective 44. Some of this light will pass through the semi-reflecting mirror 56 and this produces the image of the specimen in the microscope at the image plane I. In order to prevent visible light from interfering with the image of the focusing strip produced at image plane II an optical filter 52 is provided between the two semi-reflecting mirrors 54 and 56 — the filter passing the ultra violet light but absorbing light in the visible spectrum. Similarly a second filter 58 is provided between the semi-reflecting mirror 56 and the image plane I, this second filter passing light in the visible spectrum but absorbing ultra violet light.

The two filters 52 and 58 are not however necessary if the semi-reflecting mirror 56 is dichroic i.e. it reflects ultra violet light but transmits light in the visible range.

Where the two light sources 48 and 50 both employ light in the visible range but of different wave lengths, filters 52 and 58 will probably be required and a further filter 60 will be required in the source 48, filter 60 having the characteristic that it passes only the light of one wave length (that chosen to illuminate the specimen by transmission). Alternatively filter 60 can be incorporated within the specimen carrier either by providing a covered coating immediately below the specimen or mounting the specimen on a piece of coloured filter glass.

As previously described, the image of the specimen obtained at image plane I can be viewed by a television camera and in view of the filtering techniques employed none of the area of the specimen seen by the television camera will be obscured by the focusing strip. Thus the whole field of view may be employed for the specimen.

FIG. 7 illustrates the complete automatic focusing system incorporating a transmission specimen microscope operating as shown in FIG. 6. Where appropriate the same reference numerals have been employed and the microscope denoted generally by reference numeral 62 can be seen to comprise an image optical tube 46 having an objective 44 at its lower end for viewing a specimen illuminated from below by a light source 48 and including a separate light source 50 for producing a focusing strip image on the specimen and containing an optical system for deriving an image of the focusing strip on the target of a first camera 64 and an optical system for producing an image of the specimen on the target of a second camera 66.

For convenience the two cameras have a common power supply and are driven by common time base circuits for producing the line and frame scans. To this end a single line time base 68 and a single frame time base 70 are shown.

Since the focusing image is not seen by camera 66 the output from camera 66 does not require to be gated and a direct signal can be obtained for transmission to a monitor or to image analysis equipment.

The output from camera 64 likewise only comprises a scanned video signal corresponding to the focusing strip and no gating is therefore necessary to separate the focusing strip content from the remainder of an image. However gating is required in order to separate the video content corresponding to the one set of slits of one grating from that corresponding to the slits in the other grating. To this end synchronising pulses are derived from the line time base to trigger a square wave generator 72. The generator is arranged to produced *n* blanking pulses during a line scan period and then to revert to a quiescent state awaiting the arival of a synchronising pulse indicating the beginning of the next line scan. The number of blanking pulses is chosen to correspond to the number of slits 32 in one or other of the gratings 28, 30. Preferably a variable phase shift circuit (not shown) is provided in the line delivering the synchronising pulses to the square wave generator 72 so that the generation of the blanking pulses can be made to correspond exactly with the position of the amplitude variations in the video signal corresponding to the slits in the grating. The output from the square wave generator 72 is applied to one input of an AND gate 74 (not a logic gate, but an analogue gate) whose other input is supplied with the video output signal from the camera 64. The square wave pulses are arranged to gate the AND gate 74 so as to pass the video signal from the camera 64 for the duration of each square wave pulse but to block the video signal during the spaces between the pulses.

A second AND gate 76 is provided whose one input is also supplied with video signal from the camera 64 but whose other input is provided with the compliment of the square wave pulses from the generator 72(derived by supplying the output from the generator 72 to a phase inverting network 78). Thus the output from the phase inverting network 78 comprises a pulse train in which the pulses correspond to the spaces in the pulse train from the output from the generator 72.

The gated video signal from the two AND gates 74 and 76 is filtered in high pass filters 78 and 80 respectively and subsequently amplified in video amplifiers 82 and 84. The two signals are then applied to a differential amplifier 86 which provides an output whose magnitude corresponds to the difference in amplitude between the output signals from the amplifiers 82 and 84 and whose polarity is dependent on which output signal is greater than the other. The error signal so produced is applied to a power amplifier 88 to provide a current for driving a transducer unit (not shown) forming part of a focus control 90, the transducer unit following changes in amplitude and polarity of the current from the amplifier 88 so as to correct the focus setting of the microscope 62.

It will be appreciated that any method may be employed for utilizing the error signal derived by the differential amplifier 86 and the simple arrangement illustrated in FIG. 7 is only by way of example. Thus as an alternative, an incremental servo system may be employed in which the error signal is subjected to threshold detection and a binary control signal derived from it along one of two lines depending on the polarity of the original signal, the binary signal producing an incremental change in the focus setting in the appropriate direction. The provision of the threshold ensures that noise is eliminated from the signal supplied to the focus control but introduces a fixed focusing error since, once the output from the differential amplifier 86 is less than the threshold no further increments of change will be effected and the focusing system will settle at the last adjustment of the focusing control. However a distinct advantage of such a system is that the focusing servo mechanism will not continuously hunt for a position of optimum focus.

In the embodiment of the invention illustrated in FIGS. 6 and 7 the transmitted light and the reflected light are split and supplied to two separate detectors (cameras 64 and 66). However it will be appreciated that provided the reflected and transmitted light can both be detected by a single detector such as a television camera having a suitable target material, both the image of the specimen (corresponding to the tramitted light) and the focusing strip (corresponding to the reflected light) can be imaged at image plane I in which event semi-reflecting mirrror 54 and filter 58 are not necessary and the semi-reflecting mirror 56 must be such that it will both transmit and reflect light from source 50. However, since both the specimen image and the focusing strip image appear on the same camera target further gating circuits (as described with reference to FIG. 4) are necessary to split the scanned video signal during each frame scan as between those line scans which only intersect the specimen and those line scans which intersect the focusing strip reflected from the wave length selected coating on the specimen.

It will also be appreciated that either method of obtaining signals corresponding to the focus of the slits may be employed and either the peak white (or peak black) detector circuits 27, 29 of FIG. 4 employed or the high frequency filters 78, 80 as actually described with reference to FIG. 7.

We claim:

1. An automatic focusing system for obtaining a correctly focused image of a specimen mounted on a carrier, comprising a first optical system including at least one lens, two objects spaced by different amounts from a first surface disposed on said carrier, said first surface being light reflective, means for producing a single light beam for illuminating said two objects which are positioned in the path of said single beam, a subsidiary optical system for forming an image of said two objects, a lens of said first system forming part of said subsidiary system, a single photosensitive surface onto which the images of said two objects is reflected by said light reflective surface, means for scanning said photosensitive surface and for generating a video signal corresponding thereto, means for deriving from said video signal a first signal whose magnitude corresponds to the degree of sharpness of focus of one of said objects in said image and a second signal whose magnitude corresponds to the degree of sharpness of focus of the other of said objects in said image, the degree of sharpness of focus of said first and second objects being determined by the spacing between the carrier and said lens which is common to said two optical systems, the spacing between each of said two objects and said photosensitive surface being such so that said two objects are equally defocused in said image when the spacing between said carrier and said first optical system is such that said specimen is correctly focused, circuit means for generating an electrical error signal whose magnitude is proportional to the difference between said magnitudes of said first and second signals and focus adjusting means operable in response to said error signal for altering the spacing between said carrier and said first optical system to reduce the magnitude of said error signal.

2. A system as set forth in claim 1 wherein said circuit means generates an error signal which is of a polarity indicative of whether said spacing is to be increased or decreased so as to reduce the error signal magnitude.

3. A system as set forth in claim 1 wherein said two objects are gratings having parallel alternate narrow and wide slits and wherein said two gratings are positioned so that the narrow slits of one are aligned with the wide slits of the other and vice versa.

4. A system as set forth in claim 1 in which said first surface is surface of said specimen.

5. A system as set forth in claim 1 in which said specimen is mounted on a light reflecting backing material which constitutes the reflecting surface.

6. A system as set forth in claim 1 in which a polished surface of said carrier constitutes the reflecting surface.

7. A system as set forth in claim 3 in combination with an incident light microscope including an incident light illumination system, in which the two gratings are postioned one on either side of the field stop of the illumination system so that they just extend into the area of the field stop along one edge thereof.

8. A system as set forth in claim 7 in combination with a television camera in which the focussed image of the specimen is formed on the target of the camera.

9. A system as set forth in claim 8 in which the images of the gratings are also formed on the camera target and the gratings are orientated so that the slits are perpendicular to the direction of line scanning.

10. A system as set forth in claim 9 further comprising gating means for gating the video signal obtained by line scanning in synchronism with the scan so as to release as two separate electrical signals the amplitude excursions of the video signal corresponding to the two sets of narrow slits in the two gratings.

11. A system as set forth in claim 10 wherein means for deriving first and second signals corresponding to the degree of sharpness comprises means for generating an average value of said amplitude excursions during each frame scan for each of said two separate signals.

12. A system as set forth in claim 3 in combination with a transmission illumination microscope including a source of illumination for illuminating the specimen from below and a secondary illumination system for illuminating the specimen from above in which the two gratings are positioned one on either side of the field stop of the secondary illumination system so that they just extend into the area of the field stop along one edge thereof; the secondary illumination system having a light source producing a radiation of different wavelength from that employed to produce the light for illuminating the specimen from below and said reflecting surface disposed on said carrier comprising a wavelength-selective optical coating which transmits the illumination from the source below the specimen but reflects that from the secondary system.

13. A system as set forth in claim 12 in which the focussed image of the specimen and the de-focussed images of the gratings are formed on the target of a television camera which is sensitive to both wavelengths.

14. A system as set forth in claim 12 including wavelength selective means for separating the transmitted light from the reflected light, a first television camera to which one of the separated beams of light is fed and a second television camera to which the other separated beam of light is fed.

15. A system as set forth in claim 1 in which said objects have a distinct shape and wherein said image or said two objects formed by said subsidiary optical system corresponds in shape to the distinct shape of said objects.

16. A system as set forth in claim 15 wherein each of said objects is shaped so that the video signal produced by scanning said image of said two objects on said photosensitive surface has a high frequency component and wherein said means for deriving includes means for separating out said high frequency component of said video signal.

* * * * *